United States Patent [19]

Umezawa et al.

[11] 4,429,317

[45] Jan. 31, 1984

[54] INK EJECTION HEAD

[75] Inventors: Michio Umezawa, Kawasaki; Osamu Naruse, Hatano; Tatsuya Furukawa; Tamio Ohori, both of Yokohama; Isokazu Furukawa, Sagamihara; Sadao Kakeno, Yokohama, all of Japan

[73] Assignee: Ricoh Company, Ltd., Japan

[21] Appl. No.: 379,307

[22] Filed: May 18, 1982

[30] Foreign Application Priority Data

May 19, 1981 [JP] Japan ................................ 56-74128
May 23, 1981 [JP] Japan ................................ 56-77379

[51] Int. Cl.[3] ............................................ G01D 15/18
[52] U.S. Cl. ...................................... 346/75; 346/1.1; 346/140 R
[58] Field of Search ....................... 346/75, 1, 140 PD

[56] References Cited

U.S. PATENT DOCUMENTS 3,708,118 1/1973 Keur ................................ 346/75 X
4,138,687 2/1979 Cha et al. ............................. 346/75
4,375,066 2/1983 Herd ................................ 346/75 X

*Primary Examiner*—George H. Miller, Jr.
*Attorney, Agent, or Firm*—Guy W. Shoup; Gerard F. Dunne

[57] ABSTRACT

An ink ejection head including a nozzle holding member having an ink ejection nozzle threadably connected to a forward end portion of a liquid chamber structure. The ink ejection heads further includes a sealing member, such as a packing or an O-ring, located inwardly of a threaded connection as viewed from a liquid chamber in the liquid chamber structure. Introduction of dust or grit through the threaded connection into the liquid chamber can be effectively avoided by this arrangement, to thereby prevent obturation of the ink ejection nozzle.

3 Claims, 8 Drawing Figures

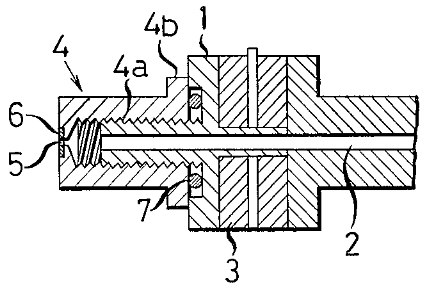
FIG. 1(a)
PRIOR ART
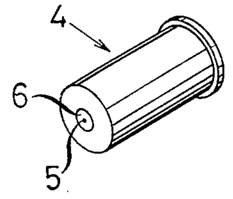
FIG. 1(b)
PRIOR ART
FIG. 2
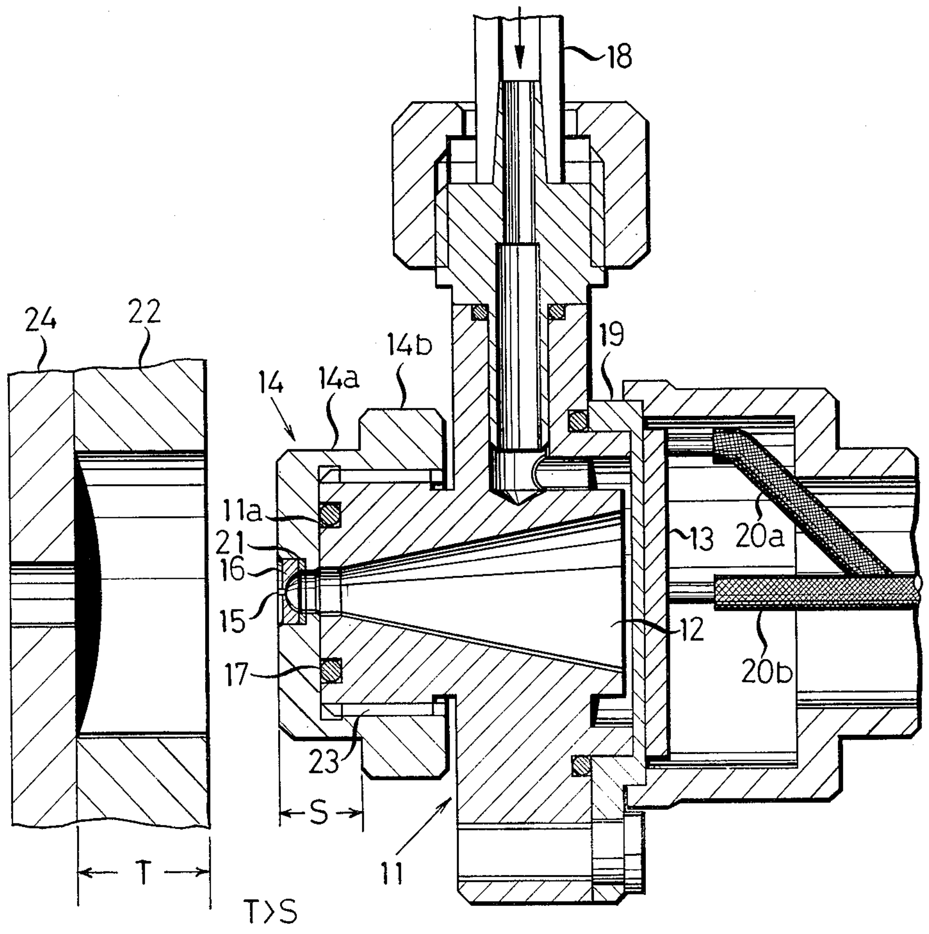

INK EJECTION HEAD

FIELD OF THE INVENTION

This invention relates to an improved ink ejection head suitable for use with an ink jet printing apparatus, for example, and a method of fabricating such ink ejection head.

BRIEF DESCRIPTION OF THE DRAWINGS

FIG. 1(*a*) is a sectional view of an ink ejection head of the prior art;

FIG. 1(*b*) is a perspective view of the nozzle holding member of the ink ejection head shown in FIG. 1(*a*), showing its external appearance;

FIG. 2 is a sectional view of the ink ejection head comprising one embodiment of the invention;

DESCRIPTION OF THE PRIOR ART

Figure 3:
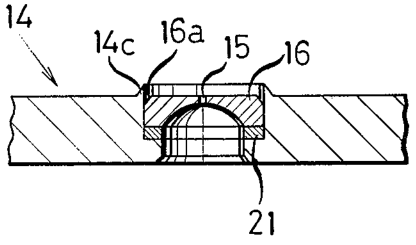
FIG. 3 is a view of one process step being performed for fabricating the ink ejection head according to the method comprising another embodiment of the invention.

FIG. 1 shows one type of ink ejection head of the prior art, which comprises a nozzle holding member 4 having an ink ejection nozzle 5 assembled with a liquid chamber structure 1 by threadably connecting the nozzle holding member to a forward end portion of the liquid chamber structure 1. In FIG. 1, the liquid chamber structure 1 is formed with a liquid chamber 2 in its interior and includes a vibrator 3 for imparting vibration to the nozzle 5. The nozzle holding member 4 holds at its forward end portion a nozzle body 6 formed with the nozzle 5. Formed on the inner wall surface of the nozzle holding member 4 is an internally threaded portion 4*a* which is threadably connected with an externally threaded portion at a forward end portion of the liquid chamber structure 1 to provide an ink ejection head. A flange 4*b* of the nozzle holding member 4, holds an O-ring 7 for avoiding leakage of ink to outside from the liquid chamber 2.

In the ink ejection head construction described hereinabove, the nozzle holding member 4 is removably mounted on the liquid chamber structure 1. By virtue of this arrangement, it is possible to readily carry out cleaning when the nozzle 5 becomes obturated by dust, for example. However, in the aforesaid construction, the O-ring 7 for providing a seal to the liquid chamber 2 is located outwardly of any threadable connection as viewed from any liquid chamber 2, so that the dust deposited on the threadable connection or the grit introduced into the threadable connection when the nozzle holding member is threadably mounted on or removed from the liquid chamber structure might inadvertently be introduced into the liquid chamber 2, thereby causing obturation of the nozzle 5 even though the ink being supplied to the liquid chamber 2 may be strained by a filter before being charged into the liquid chamber 2.

SUMMARY OF THE INVENTION

This invention has been developed for the purpose of obviating the aforesaid problem of the prior art. Accordingly an object of the invention is to provide an ink ejection head which is low in cost and high in performance operational while being free from the risk of foreign matter being introduced into the ink in the liquid chamber 2.

Another object of the invention is to provide a method of fabricating the improved type of ink ejection head with a high degree of efficiency and at a low cost.

One characteristic of the invention is that the nozzle holding member has its outer periphery formed include a positioning forward end portion for fitting the nozzle holding member in a head positioning member, and a rearward portion which is knurled to facilitate mounting the nozzle holding member on and removing same from the liquid chamber structure by hand. A sealing member which may be either an O-ring or a packing, is located inwardly of the threadable connection between the nozzle holding member and the liquid chamber structure as viewed from the liquid chamber, to prevent invasion of the liquid chamber by dust and grit.

Another feature of the invention is that projection the nozzle holding member is formed at the peripheral edge of an inlet of a recess on its front surface with a small projection so that after a nozzle body is inserted in the recess through the entrance, the nozzle body can be firmly secured to the nozzle holding member by caulking the small projection down over an edge portion of the nozzle body.

DESCRIPTION OF THE PREFERRED EMBODIMENTS

Referring to FIG. 2, is a liquid chamber structure 11 has a liquid chamber 12 formed therein for receiving ink through an ink introducing line 18. A piezoelectric vibrator 13 imparts vibration to the ink in the liquid chamber 12 through a vibrating plate 19. Upon receiving an exciting voltage from leads 20*a* and 20*b*. A nozzle holding member holds a nozzle body 16 having a nozzle 15 in position at the outlet of the liquid chamber 12. The nozzle body 16 is fitted, together with a flat packing 21, in a recess formed in the nozzle holding member 14 as will be described subsequently. The nozzle holding member 14 includes an outer periphery of a dual construction comprising a positioning forward portion 14*a* of an outer diameter matching the inner diameter of a head positioning member 22 carrying charging electrodes 24 and a knurled rearward portion 14*b* (hereinafter a knurled offset portion) of a larger outer diameter than the positioning forward end portion 14*a*. The liquid chamber structure 11 is formed with a groove 11*a* at a front surface thereof against which the nozzle holding member 14 abuts at its inner wall surface for receiving an O-ring 17 for providing a seal to the liquid chamber 12. The nozzle holding member 14 and the liquid chamber structure 11 are threadably connected to each other at a threadable connection 23.

In the embodiment of the ink ejection head of the aforesaid construction in conformity with the invention, it is possible to removably mount the nozzle holding member 14 on the liquid chamber structure 11 with ease by turning the knurled rearward portion 14*b* by hand. If the knurled rearward portion 14*b* is tightened to bring the inner wall surface of the nozzle holding member 14 into intimate contact with the forward end surface of the liquid chamber structure 11, then the O-ring 17 is pressed tight to provide a satisfactory seal to the ink in the liquid chamber 12. Since the O-ring 17 is located inwardly of the threaded connection 23 as viewed from the liquid chamber 12, any grit introduced into the threaded connection 23 is kept from being introduced into the liquid chamber 12 to enable obturation of the nozzle 15 by such grit to be substantially eliminated. By bringing the inner wall surface of the nozzle holding member 14 into metal-to-metal contact with the forward end surface of the liquid chamber structure 11, a loss of vibration energy transmitted to the nozzle 15 can be avoided to increase the excitation efficiency of the piezoelectric vibrator 13. Also, if the positioning forward end portion 14*a* (of a size S) of the nozzle holding member 14 is fitted in the head positioning member 22 (of a size T of T>S) held in a fixed position by an ink jet printing apparatus after the ink ejection head is assembled, it is possible to obtain correct positioning of the loading electrodes 24 and other parts of the ink jet printing apparatus with respect to distance, coaxiality, etc., thereby permitting complicated adjustments to be eliminated.

From the foregoing description, it will be appreciated that obturation of the nozzle 15 by dust and grit and other troubles can be substantially eliminated, and the nozzle holding member can be readily removed and mounted on the liquid chamber structure 11 as when cleaning of the ink ejection head is carried out. Moreover, positioning of the ink ejection head with respect to various parts of the apparatus is facilitated and production cost can be greatly reduced.

As described hereinabove, the nozzle body 16 is fitted together with the flat packing 21 in the recess formed in the nozzle holding member in the construction of the embodiment shown in FIG. 2. The method of obtaining this positioning of the nozzle body 16 will be described.

In FIG. 3, the recess for receiving the nozzle body 16 which is fitted therein with a small play (loose fitting) is formed at the forward end surface of the nozzle holding member 14 and has a small projection 14*c* extending outwardly along the entire peripheral edge of its inlet. To increase the effect achieved, the nozzle body 16 may have its corners slightly chamfered in positions corresponding to the peripheral edge portion of the inlet of the recess, as indicated at 16*a*. After preparing the nozzle holding member 14 and the nozzle body 16 of the aforesaid construction and inserting the flat packing 21 and the nozzle body 16 successively in the indicated order in the recess, the small projection 14*c* at the entire peripheral edge of the inlet of the recess is caulked or bent over the edge portion of the nozzle body 16 by a special tool.

Figure 4:
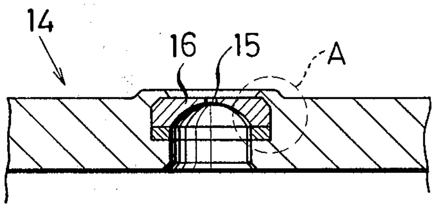
FIG. 4 is a view of the one process step illustrated in FIG. 3 being completed.
Figure 5:
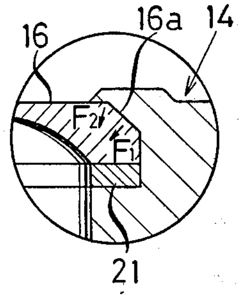
FIG. 5 is a view showing, on an enlarged scale, the portion A shown in FIG. 4.

FIG. 4, and FIG. 5 in which a section A shown in FIG. 4 is shown on an enlarged scale, show the nozzle body 16 secured in place in the recess in the nozzle holding member 14 after caulking. The small projection 14*c* (FIG. 3) is caulked so that it will be bent to enclose the chamfered portion 16*a* of the nozzle body 16. At this time, stress is applied to the nozzle body 16 as indicated by arrows F1 and F2 in FIG. 5. F2 is a vertical component of the stress that exerts no influences on the nozzle 15. It is only the horizontal component F1 of the stress that tends to cause deformation of the nozzle 15. However, the horizontal component F1 is very small in magnitude and causes no trouble.

Figure 6A:
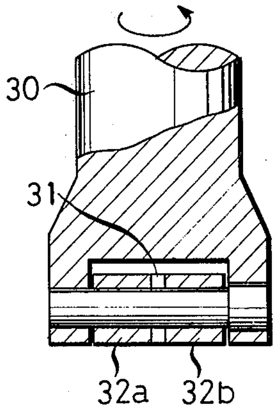
FIG. 6 is a view of a tool exclusively used for performing the method according to the invention into practice.
Figure 6B:
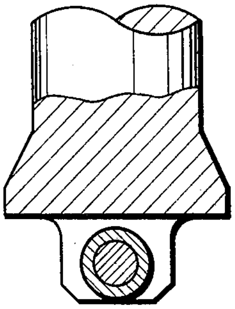

FIG. 6 shows an example of the tool specially used exclusively for effecting the caulking operation A shaft 30 has two rollers 32*a* and 32*b* attached to the forward end thereof and separated by a spacer 31. The rollers 32*a* and 32*b* are pressed against the small projection 14*c* (FIG. 3) at the peripheral edge of the inlet of the recess and rotated to bend same to enclose the peripheral portion of the nozzle body 16.

In the embodiment shown and described hereinabove, the small projection 14*c* is shown to extend around the entire peripheral edge of the inlet of the recess of the nozzle holding member 14. However, the invention is not limited to this specific form of the small projection, and the small projection may be suitably divided into a plurality of segments extending along the inlet of the recess.

In the method of attaching the nozzle body 16 to the nozzle holding member 14 wherein the small projection 14*c* formed at the peripheral edge of the inlet of the recess formed in the nozzle holding member 14 is caulked after the nozzle body 16 is inserted in the recess so that the small projection 14*c* is bent to cover the peripheral portion of the nozzle body 16 to secure the latter in place, the following advantages are offered. No excess stress is applied to the nozzle body 16 and deformation of the vicinity of the nozzle 15 is minimized. The nozzle body 16 can be securedly held in place in the recess in the nozzle holding member 14, and a satisfactory seal can be provided to the ink in the liquid chamber 13 after the nozzle holding member 16 is assembled with the liquid chamber structure 11 to provide an ink ejection head.

The method of attaching the nozzle head 16 described hereinabove offers an additional advantage in that it is economical because no special parts are required except for the caulking tool.

What is claimed is:

1. An ink ejection head comprising a liquid chamber structure, a nozzle holding member and an ink ejection nozzle held in said nozzle holding member, said nozzle holding member being threadably connected to a forward end portion of said liquid chamber structure, wherein the improvement resides in that said nozzle holding member comprises:

a positioning forward end portion having a predetermined outer diameter allowing the positioning forward end portion to be snugly fitted at its outer peripheral surface in a positioning member; and a rearward portion having an outer diameter greater than the outer diameter of said positioning forward end portion;

and said liquid chamber structure comprises:

a groove formed in a forward end surface of the liquid chamber at which the nozzle holding member is brought into contact at its inner wall surface for receiving therein a sealing member.

2. A method of producing the ink ejection head claimed in claim 1 wherein a nozzle body having a nozzle for ejecting ink is fitted in a recess formed in the nozzle holding member and secured in place to thereby attach the ink ejection nozzle to the nozzle holding member, such method comprising the steps of:

forming a small projection at the peripheral edge of an inlet of the recess formed in the nozzle holding member; and caulking the small projection to bend same to enclose a peripheral portion of the nozzle body after the nozzle body is inserted in the recess to thereby secure the nozzle body in place.

3. An ink ejection head according to claim 1, said rearward portion having a knurled outer surface.

* * * * *